United States Patent [19]

Green et al.

[11] Patent Number: 4,865,444
[45] Date of Patent: Sep. 12, 1989

[54] APPARATUS AND METHOD FOR DETERMINING LUMINOSITY OF HYDROCARBON FUELS

[75] Inventors: Gary J. Green, Yardley; Tsoung Y. Yan, Philadelphia, both of Pa.

[73] Assignee: Mobil Oil Corporation, New York, N.Y.

[21] Appl. No.: 108,596

[22] Filed: Oct. 15, 1987

Related U.S. Application Data

[63] Continuation-in-part of Ser. No. 596,990, Apr. 5, 1984, abandoned, and a continuation of Ser. No. 96,767, Sep. 11, 1987, abandoned, which is a continuation of Ser. No. 762,487, Aug. 5, 1985, abandoned.

[51] Int. Cl.$^4$ .................... G01N 1/20; G01N 21/72
[52] U.S. Cl. ........................................ 356/36; 356/315
[58] Field of Search ...................... 356/36, 315, 316

[56] References Cited

U.S. PATENT DOCUMENTS

| | | | |
|---|---|---|---|
| 3,489,396 | 1/1970 | D'Aragon | 261/76 |
| 3,677,447 | 7/1972 | Rentz | 222/440 |
| 3,731,850 | 5/1973 | Weitzel et al. | 222/420 |
| 3,811,839 | 5/1974 | Di Pietro et al. | 356/36 |
| 3,979,334 | 9/1976 | Lee et al. | 252/448 |
| 4,441,532 | 4/1984 | Hrubesh | 222/440 |
| 4,446,993 | 5/1984 | Tokorazawa | 222/420 |
| 4,568,267 | 2/1986 | Kendall-Tobias | 356/315 |

FOREIGN PATENT DOCUMENTS

| | | | |
|---|---|---|---|
| 1068223 | 9/1957 | Fed. Rep. of Germany | 261/76 |
| 2045390 | 3/1972 | Fed. Rep. of Germany | 222/420 |
| 2259521 | 6/1973 | Fed. Rep. of Germany | 222/420 |
| 1411783 | 7/1964 | France . | |
| 286273 | 2/1953 | Sweden | 222/420 |
| 1039539 | 9/1983 | U.S.S.R. | 261/76 |
| 1067417 | 1/1984 | U.S.S.R. | 356/315 |
| 1311285 | 3/1973 | United Kingdom . | |
| 1354977 | 5/1974 | United Kingdom . | |

OTHER PUBLICATIONS

W. R. Lane, "A Microbutte for Producing Small Liquid Drops of Known Size," Journal of Scientific Instruments, vol. 24, Apr. 1947, pp. 98–101.
K. Riel et al, "An Apparatus for the Production of Uniform Sized Water Drops at Desired Time Intervals," Review of Scientific Instruments, vol. 4, Apr. 1969, pp. 533–534.
J. J. Sangiovanni et al, "A Theoretical & Experimental Investigation of the Ignition of Fuel Droplets," Combustion Science and Technology, 1979, vol. 16, pp. 59–70.
Hieftje et al, "A New Approach to Flame Spectrometric Analysis Using Isolated Droplets of Sample Solution," Analytical Chemistry, vol. 41 #13, Nov. 1969, pp. 1735–1744.
Boss et al, "A New Accurate Method for the Measurement of Rise Velocities in Laminar Flames," Applied Spectroscopy, vol. 32, #4, (Jul.–Aug.) pp. 377–380.
Van Nostrand's Scientific Encyclopedia Fourth Edition, 1968, p. 286.
Evaporation and combustion of single fuel droplets in a hot atmosphere, M. A. Saad, Doctoral Dissertation Series Publication, No. 21,355, University of Michigan, 1956.
J. C. Lasheras, et al, "Initial Observations on the Free Droplet Combustion Characteristics of Water-In-Fuel Emulsions," Combustion Science And Technology, 1979, vol. 2, pp. 1–14.
C. H. Wang et al. "An Experimental Investigation of the Gasification Mechanism of Freely-Falling Multicomponent Droplets," Paper No. 82-81, Fall Western States Meeting, The Combustion Institute, Sandia Laboratories, Livermore, CA, Oct. 11–12, 1982.
J. A. Bolt et al, "Combustion Rates of Freely Falling Fuel Drops in a Hot Atmosphere," Sixth Symposium International on Combustion, The Combustion Institute, 1957, pp. 40, 46 & 717.

Primary Examiner—Vincent P. McGraw
Attorney, Agent, or Firm—Alexander J. McKillop; Charles J. Speciale

[57] ABSTRACT

Disclosed is apparatus comprising a means for injecting a controlled stream of hydrocarbon liquid into a concurrently flowing stream of gas in a Venturi forming droplets. Droplets are subsequently combusted in a gas stream. The level of radient emissions is measured photoelectrically. Results obtained are useful in predicting service life of combustor walls in jet engines and the like.

17 Claims, 5 Drawing Sheets

DROPLET GENERATOR

APPARATUS AND METHOD FOR DETERMINING LUMINOSITY OF HYDROCARBON FUELS

This is a continuation-in-part of copending application Ser. No. 596,990, filed Apr. 5, 1984, now abandoned, and a continuation of copending application Ser. No. 096,767, filed Sept. 11, 1987, now abandoned, which is a continuation of application Ser. No. 762,487, filed Aug. 5, 1985, now abandoned. Each of the foregoing applications is incorporated herein by reference.

NATURE OF THE INVENTION

This invention relates to methods and apparatus for measuring the luminosity of hydrocarbon fuels, particularly jet fuels used in aviation turbine engines.

BACKGROUND OF THE INVENTION

The luminosity associated with the combustion of aviation turbine fuels can have a significant impact on the performance and long term durability of jet aircraft engines. Radiative heat transfer to the combustor liner walls increases with increasing luminosity, leading to higher wall temperatures and ultimately to reduced combustor lifetimes due to loss of structural integrity. Flame luminosity is also related to the amount of soot formed from the fuel, an important consideration for exhaust smoke emissions.

Standardized fuel quality specifications have been developed in an attempt to consistently insure proper combustion characteristics related to flame luminosity and soot formation. These specifications are based on ASTM test methods and include smoke point tests (D 1322) and luminometer number test (D 1740). However, because these testing procedures are conducted under conditions far different from those in real engine combustors, it has often been difficult to correlate these results with the engine performances. As a result, some engine combustors have been modified and instrumented to measure the flame luminosity and its effect on the liner temperatures as a function of fuel type. Good results can be obtained from such experiments; there are, however, several drawbacks to this approach:

1. The results are highly sensitive to the particular model of the combustor used because of the uniqueness of the design, such as spray, cooling method and physical configuration.

2. These combustor test rigs are complex and are expensive to construct and operate. The large fuel samples required often exceed the volume of the experimental fuels available.

OBJECT OF THE INVENTION

A primary object of this invention is to provide an improved method for measuring jet fuel luminosity and predicting combustor liner temperature increases. Another object of this invention is to provide an apparatus for this measurement which is relatively simple to construct and easy to operate.

SUMMARY OF THE INVENTION

Briefly stated, this invention comprises a method for determining the quality of a liquid hydrocarbon fuel by measuring its luminosity comprising:

(a) injecting a stream of droplets of said liquid fuel into a combustion zone;

(b) combusting said stream droplets in said combustion zone; and (c) measuring the intensity of the radiation emitted by the combusting fuel.

In another aspect, this invention comprises the apparatus for carrying out the test procedure summarized above. This invention is particularly useful in that it enables quality determination under the close approximate of actual conditions in a jet engine.

DETAILED DESCRIPTION OF THE INVENTION

Figure 2:
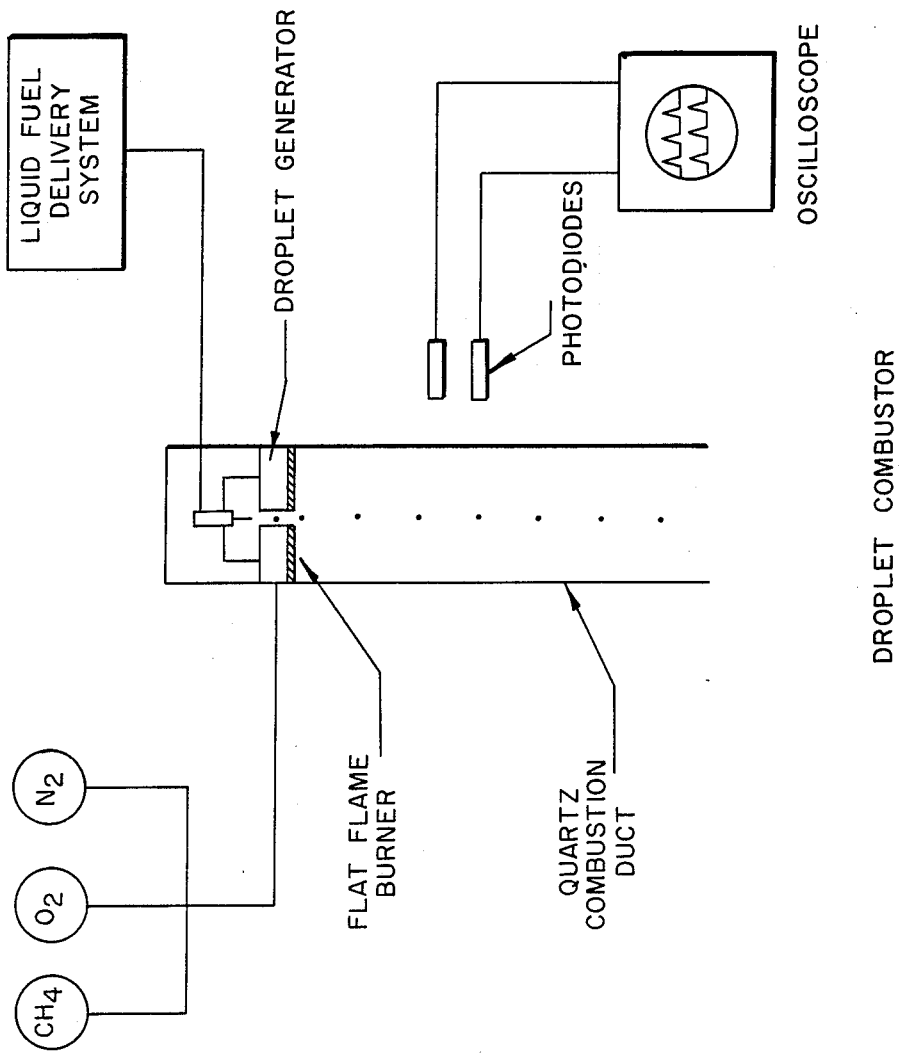
FIG. 2 is a schematic drawing of the overall test apparatus.

One arrangement of apparatus which can be utilized in the process of this invention is shown in FIG. 2. It consists primarily of a droplet generating device 8 communicating with a combustion duct or chamber 6 fitted with a photodiode 10 and oscilloscope to measure the luminosity of the burning drops generated.

Figure 1:
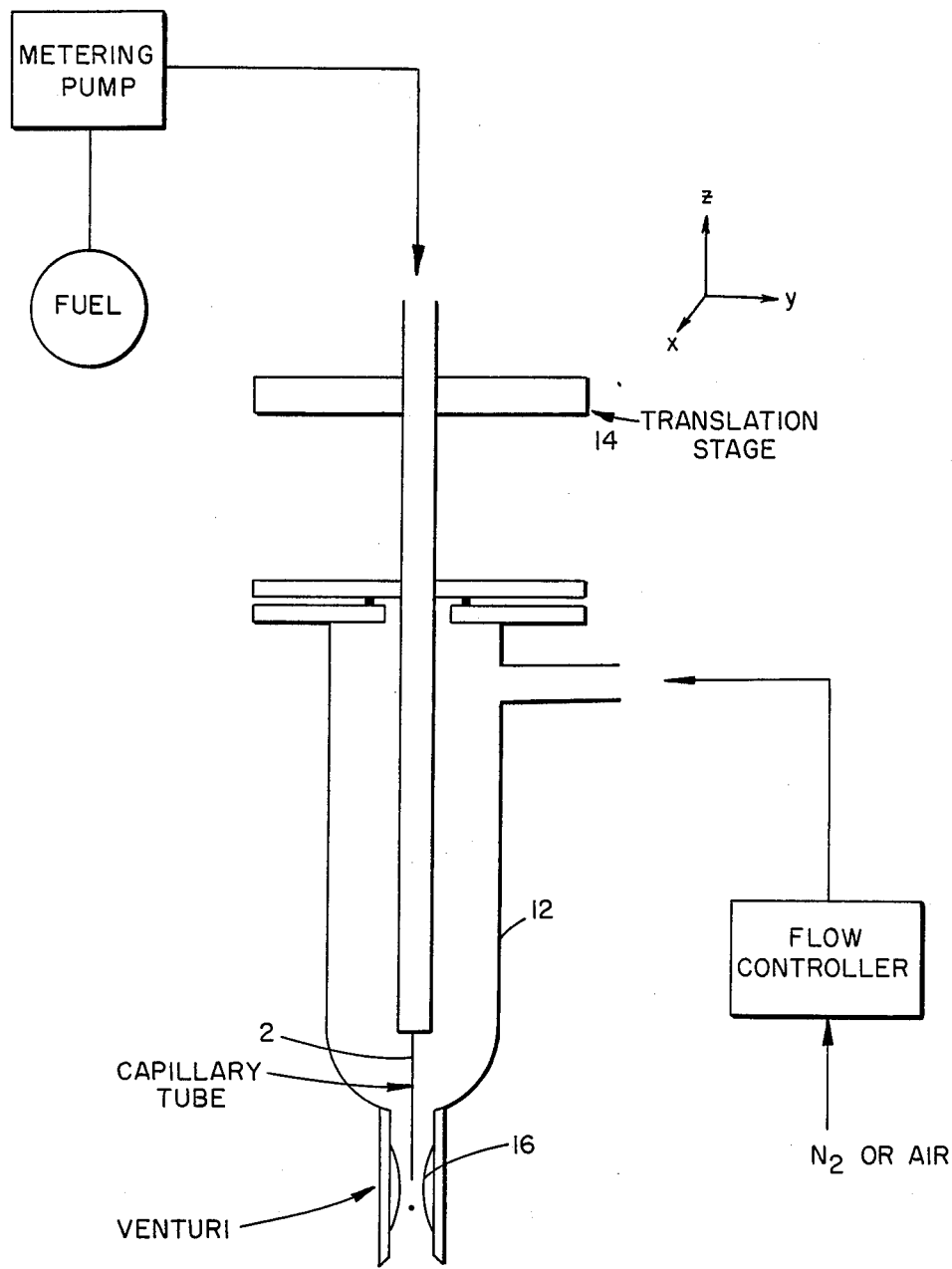
FIG. 1 is a schematic drawing of a portion of the test apparatus of this invention wherein a stream of liquid hydrocarbon fuel droplets is generated.

FIG. 1 is a schematic drawing of the droplet generating portion of the apparatus. The device basically consists of a vertical capillary tube 2 through which a liquid flows, surrounded by an outer vertical concentric tube 12 through which a gas (e.g., nitrogen) flows. A stream of small, preferably uniformly-sized and uniformly-spaced droplets is produced by inducing premature detachment of incompletely formed droplets at the tip of the capillary. This detachment is accomplished by drag caused by the annular flow of gas (preferably inert) past the capillary tip which is positioned in the throat of a venturi 16. The gas is accelerated past the tip of the capillary by the venturi and then decelerated upon its exit. Droplets thus formed are much smaller in diameter than those that would result from "natural" detachment when the weight of the droplet overcomes the interfacial tension at the capillary tip. The droplet size, spacing, frequency and initial velocity are controlled by varying the liquid flow through the capillary, the flow of gas past the capillary tip and the capillary size. Precise metering of the liquid flow is controlled with an ISCO pump, while a digital mass flow controller supplies a regulated gas flow. Accurate positioning of the capillary tip with respect to the venturi is possible with an attached micrometer-driven xyz translation stage 14.

A schematic diagram of the complete combustion apparatus is shown in FIG. 2. A hot combustion environment for the burning of liquid droplets is provided by the post-combustion gases from a lean, premixed (typically $CH_4/O_2/N_2$), laminar flat flame supported on an inverted, water-cooled burner 18. The stoichiometry and total flow of the gaseous fuel mixture to the burner is precisely controlled and monitored from an adjacent control panel via needle valves and calibrated flowmeters 20. For cooling purposes, a purge flow of gaseous nitrogen through a shroud surrounding the burner surface is also maintained from the panel. In the unlikely event of a drop in pressure in any of the gas supply lines or a power failure, a combination of pressure switches, relays, and solenoid values serve to immediately shut down the burner and provide a continuous purge of gaseous nitrogen to eliminate any residual, potentially combustible gases from the apparatus and to cool the combustion duct. The internally cooled burner surface and a series of check values in the gas lines prevent potential occurrences of flame flashback.

The combustion duct 6 is a transparent, cylindrical quartz tube. Its dimensions, for example, can be 70 mm ID×74 mm OD×1 meter long. It is suspended from the burner housing 8 via a flange assembly. Combustion gases exit the base of the duct into an exhaust collection system (not shown). Temperature profiles of the combustion gases within the duct are measured with a fine wire thermocouple probe (Pt/6% Rh vs. Pt/30% Rh) corrected for radiation and positioned with a precision XYZ translation system having 1 m of vertical travel along the axis of the duct. The previously described droplet generator (8) injects a stream of uniformly spaced, mono-sized droplets (approximately 50 to 500 microns initial diameter) down through a hole in the center of the burner into the combustion duct where they spontaneously ignite and burn after a given induction period. A bi-ocular microscope/camera system in tandem with stroboscopic back-illumination of the droplet stream can be added to facilitate both visual observation and photography of the burning droplets. Quantitative data including droplet size, spacing, and velocity, as well as qualitative information, for example, regarding gas phase soot formation, can be obtained directly from calibrated photographic records. By traversing the length of the combustion duct with the camera system, a detailed record of a droplet's combustion lifetime may be obtained.

For purposes of our invention the transparent cylindrical quartz tube is fitted with a photodiode (preferably one with a spectral response of 0.4 to 1.1 microns) positioned at multiple locations along the combustion duct. The photodiode in turn is connected to an oscilloscope. Dual photodiodes are used for droplet velocity measurements, as shown in FIG. 2, as well as for optical triggering of the stroboscopic photography system described earlier.

The unit is started by introducing the fuel gas, air and diluent through the burner at the top of the apparatus. The gaseous fuel mixture flows downward and is ignited with a propane torch. The liquid fuel pump is activated to inject the sample through the nozzle at the top of the apparatus to generate droplets. The rate of liquid fuel injection is important in that it affects the spacing of the droplets. The droplets fall down through the hot gas, ignite and burn. The photodiode 10 is aimed at the stream of burning droplets at a fixed position. The luminosity of each droplet is detected and displayed on the oscilloscope in a wave form, and the average peak intensity is read and recorded. The photodiode is moved up or down the tube to obtain the luminosity profile along the combustion duct. The maximum luminosity is used to characterize the fuel luminosity.

EXAMPLE

In tests with the apparatus, luminosity measurements of individual burning droplets of fuel were made with a photodiode (spectral response, 0.4 to 1.1 microns) positioned at multiple locations along the length of the combustion duct. Intensities were recorded as peak photodiode output voltages as displayed on an oscilloscope. Initial droplet diameters were kept constant at 350 microns, while droplet frequencies and initial velocities were maintained at 15 droplets per second and 4 meters per second, respectively. The gas flow and the temperature profile within the combustion duct were also kept constant at values corresponding to 3 to 4 meters/second and 1100° to 2000° K., respectively. These parameters were fixed in order to insure that the only variable from run to run was fuel composition.

The experimental conditions prevalent in the droplet apparatus are also similar to those in an actual gas turbine except for the operating pressure (1 atm vs. 15 atm). For example, droplet size in a typical spray is less than 100 microns, and droplet/gas relative velocities are small. Spray flame temperatures in the primary zone are 2500° K., while turbine inlet temperatures can be 800° K. and higher.

TABLE 1

| Fuel | Measured Luminosity Photodiode Output, Volts |
| --- | --- |
| Jet A | 3.8 |
| Jet A | 4.2 |
| JP4 | 2.6 |
| JP5 | 4.1 |
| *USAF JP8 | 3.0 |
| USAF JP8-AD1 | 8.3 |
| USAF JP8-AD2 | 5.8 |
| USAF JP8-AD3 | 6.6 |
| USAF JP8-AD4 | 6.8 |
| Experimental JP7 + 6 vol % 1-MN | 1.3 |

*The USAF fuels were supplied by the Air Force Aero-Propulsion Laboratory and correspond to fuels #2, 4, 5, 6 and 7, respectively, which are described in report #AFAPL-TR-79-2015.

The luminosity data for various fuels were quite reproducible. These data were comparable with those from combustor rigs in quality and have been correlated well with the liner temperature increases.

Figure 3:
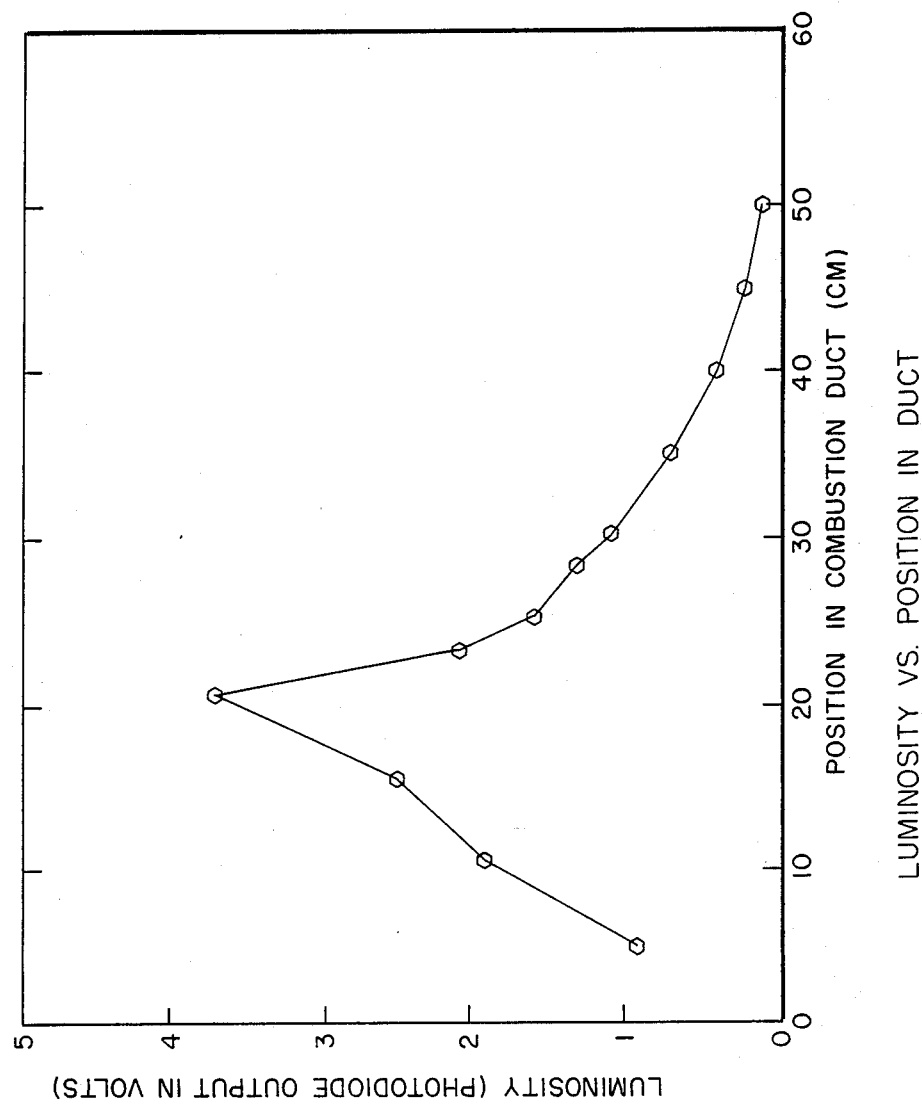
FIGS. 3 and 4 are charts showing luminosity profiles for several jet fuels as droplets of the fuel traverse the apparatus and are combusted.
Figure 4:
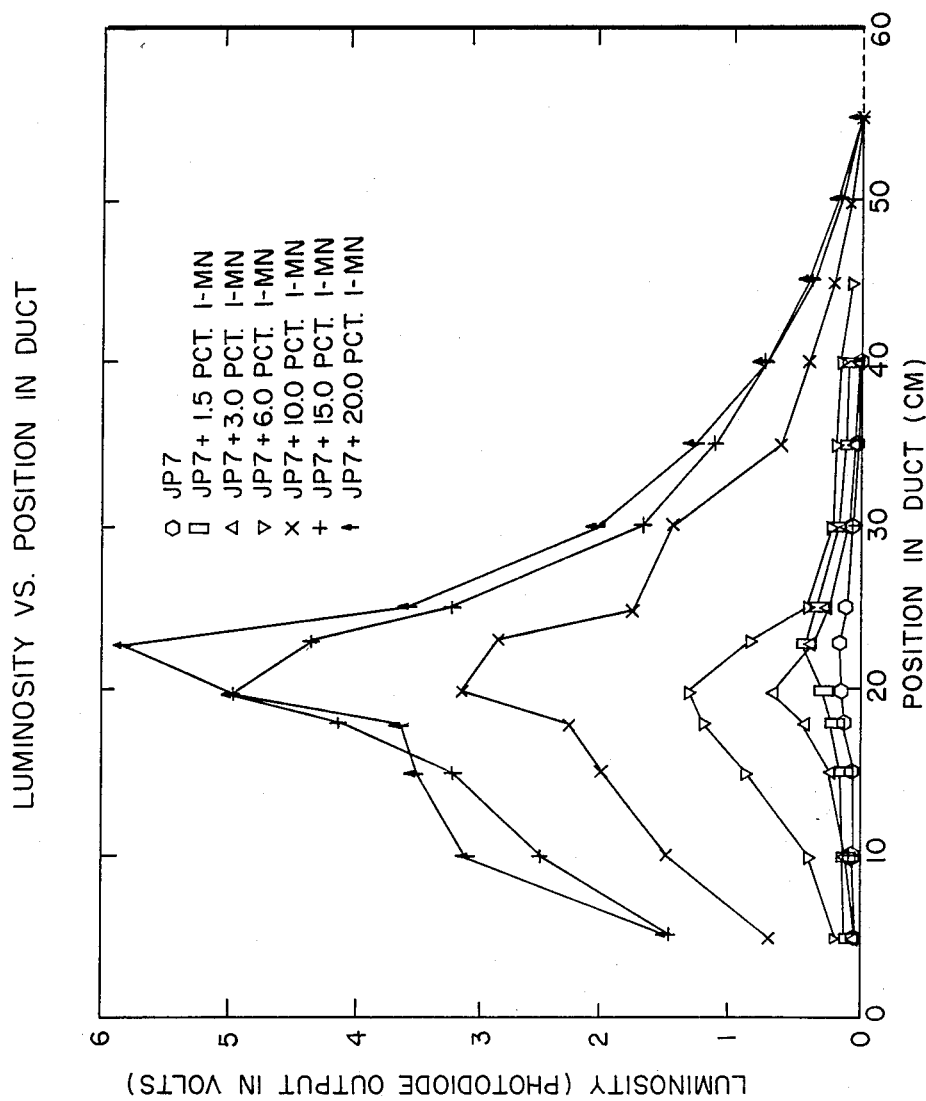
Figure 5:
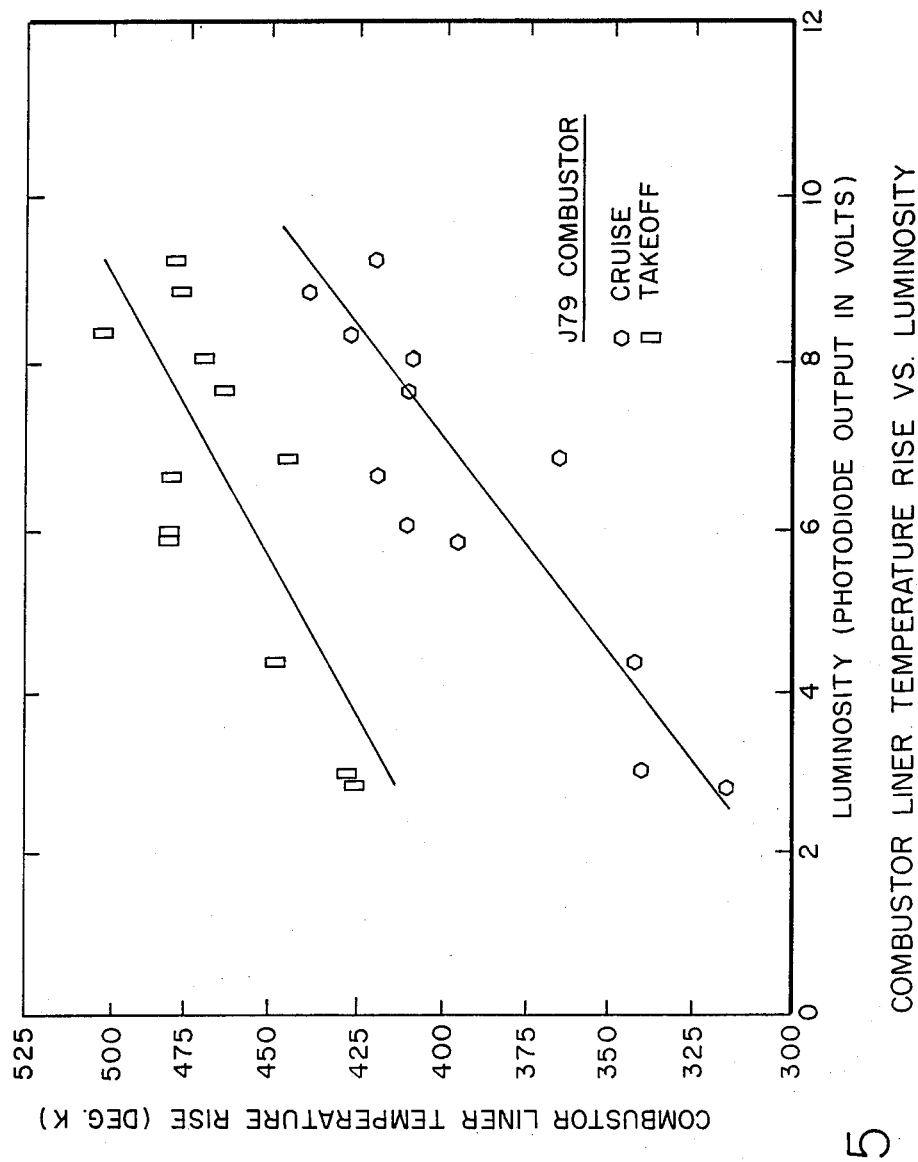
FIG. 5 is a chart showing the peak combustor liner temperature equivalent to measured luminosity in terms of voltage output by a photodiode.

A typical luminosity profile obtained under these conditions is shown in FIG. 3, where a commercial Jet A fuel was tested. FIG. 4 shows luminosity profiles for a series of aromatics-doped JP7 fuels, where 1-MN stands for 1-methylnaphthalene. Peak luminosity values for several fuels and fuel blends are shown in Table 1. Finally, FIG. 5 shows peak luminosity data measured in our apparatus plotted versus peak liner temperature increases reported in USAF report #AFAPL-TR-2015 for a J79 combustor for several fuels.

From this data it is possible, having once determined the luminosity profile of a fuel to predict the liner temperature resulting from combustion of the fuel and the corresponding life expectancy of the liner. The combustor liner temperature increase predicted from this data is given by At cruise:

$$T\ peak,\ °C. = (luminosity_{peak} + 12.2)/0.0476$$

At take off:

$$T\ peak,\ °C. = (luminosity_{peak} + 26.6)/0.0709$$

while the subsequent estimated combustor liner lifetime is given by

Relative Lifetime = 10 (0.283 − 0.0811 luminosity$_{peak}$)

where the lifetime is defined relative to that corresponding to operation of the combustor at take-off conditions on a reference USAF JP4 Fuel (T peak=425° C., Relative lifetime=1.0).

The apparatus and method described herein provides several advantages. Only small sample sizes are required. Direct and complete optical access to the combusting droplets is provided. Simple, rapid and reproducible measurements are possible. The effects of spray interaction, aerodynamics and physical configuration of the apparatus are eliminated or minimized. Operating temperatures of the apparatus are similar to those in actual engines. The droplets generated and the relative flow fields are commensurate with those in the real engine or engines being used.

What is claimed is:

1. A method for determining the quality of a liquid hydrocarbon fuel by measuring its luminosity comprising:
   (a) introducing a downflowing stream of linearly spaced droplets of said hydrocarbon fuel into a combustion zone;
   (b) combusting said stream of droplets in said combustion zone; and
   (c) measuring the intensity of the radiation emitted by said stream of droplets during said combustion.

2. The method of claim 1 wherein the spacing between said linearly spaced droplets is uniform.

3. The method of claim 1 wherein said linearly spaced droplets are of a uniform size.

4. The method of claim 1 wherein said combustion zone comprises a flowing stream of heated gas and air or oxygen.

5. The method of claim 1 wherein said combustion zone also contains a diluent gas.

6. The method of claim 1 wherein the temperature in said combustion zone is at a temperature of between about 1100° and about 2000° K.

7. The method of claim 1 wherein said combustion zone contains a hot combustion environment provided by the post-combustion gases from combusting a lean premixed mixture of methane, oxygen and nitrogen.

8. A method for determining the luminosity of a liquid hydrocarbon fuel comprising:
   (a) introducing a downflowing stream of linearly spaced droplets of said liquid fuel into a downflowing moving stream of heated oxidizing gases;
   (b) at least partially combusting said stream of droplets; and
   (c) measuring the intensity of the radiation from said combusting stream of droplets at a plurality of locations in said stream.

9. The method of claim 8 wherein the measured intensity of (c) is utilized to predict liner life of a jet engine.

10. The method of claim 8 wherein the spacing between said linearly spaced droplets is uniform and about 50 to 500 droplet diameters.

11. The method of claim 8 wherein said linearly spaced droplets are of a uniform size.

12. The method of claim 8 wherein said stream of heated oxidizing gases comprises a burning mixture of fuel gas and oxygen or air.

13. The method of claim 8 wherein said combustion zone is at a temperature of between about 1100° and about 2000° K.

14. The method of claim 8 wherein the diameter of the individual droplets is about 50 to 500 microns.

15. A device for measuring the luminosity of a burning hydrocarbon liquid fuel comprising:
   (a) a venturi positioned at or near the upper end of a transparent tubular member;
   (b) a capillary tube having an open end positioned near the throat of said venturi;
   (c) means for injecting a stream of liquid hydrocarbon from said capillary tube into said venturi and thence into said tubular member;
   (d) means for injecting a stream of gas into the space defined between said venturi tube and said capillary tube, thereby forming a series of droplets of hydrocarbon liquid;
   (e) means at or near the top of said tubular member for burning in the presence of excess oxygen a combustible gas and for igniting said droplets of hydrocarbon liquid; and
   (f) means for measuring the luminosity of said burning droplets of hydrocarbon fuel as they flow through said tubular member.

16. The device of claim 15 wherein said means of measuring luminosity is photographic means.

17. The device of claim 15 wherein said means for measuring luminosity is a photodiode electronically connected with an oscilloscope.

* * * * *